United States Patent [19]

Jenness

[11] Patent Number: 5,615,363
[45] Date of Patent: *Mar. 25, 1997

[54] OBJECT ORIENTED COMPUTER ARCHITECTURE USING DIRECTORY OBJECTS

[75] Inventor: Steven M. Jenness, Redmond, Wash.

[73] Assignee: Digital Equipment Corporation, Maynard, Mass.

[*] Notice: The term of this patent shall not extend beyond the expiration date of Pat. No. 5,463,774.

[21] Appl. No.: 456,711

[22] Filed: Jun. 1, 1995

Related U.S. Application Data

[63] Continuation of Ser. No. 84,292, Jun. 28, 1993, Pat. No. 5,463,774.

[51] Int. Cl.[6] ............................................. G06F 17/30
[52] U.S. Cl. .................................. 395/614; 364/DIG. 1; 364/282.3
[58] Field of Search .................................. 395/600, 650, 395/700

[56] References Cited

U.S. PATENT DOCUMENTS

| | | | |
|---|---|---|---|
| 4,498,132 | 2/1985 | Ahlstrom et al. | 395/775 |
| 4,499,535 | 2/1985 | Bachman et al. | 395/416 |
| 4,513,368 | 4/1985 | Houseman | 395/405 |
| 4,558,413 | 12/1985 | Schmidt et al. | 395/600 |
| 4,575,797 | 3/1986 | Gruner et al. | 395/375 |
| 5,086,504 | 2/1992 | Nemeth-Johannes et al. | 395/700 |
| 5,179,703 | 1/1993 | Evans | 395/700 |
| 5,187,790 | 2/1993 | East et al. | 395/650 |
| 5,237,680 | 8/1993 | Adams et al. | 395/600 |
| 5,257,381 | 10/1993 | Cook | 395/600 |
| 5,339,435 | 8/1994 | Lubkin et al. | 395/700 |
| 5,361,349 | 11/1994 | Sugita et al. | 395/600 |
| 5,367,671 | 11/1994 | Feigenbaum et al. | 395/600 |
| 5,412,808 | 5/1995 | Bauer | 395/600 |
| 5,463,774 | 10/1995 | Jenness | 395/600 |

*Primary Examiner*—Thomas G. Black
*Assistant Examiner*—John C. Loomis
*Attorney, Agent, or Firm*—Gary S. Williams; Flehr, Hohbach, Test, Albritton & Herbert

[57] ABSTRACT

The objects stored in computer's memory include a directed graph of object directories. Each object directory stores object names and object pointers for locating and accessing other objects. A root directory object, which is the starting point for locating any specified object, stores object names and object pointers to a set of first level object directories. Each object has an associated pathname that defines a path through the directed graph of object directories for accessing that object. More particularly, each pathname is a succession of path elements, proceeding from a first path element to a last path element. A default pathname parsing procedure is used for parsing any specified object's pathname, starting with said first path element, until the default pathname parsing procedure accesses an object directory having its own distinct pathname parsing procedure. At least one object directory has its own distinct pathname parsing procedure for locating objects whose pathname includes a path element that identifies that object directory. When parsing a specified object pathname, the path elements are successively parsed, one at a time by accessing the corresponding object directory, and then using the information in that object directory to access the object or directory object associated with a next path element. When an object directory is accessed that has its own pathname parsing procedure, that object directory's pathname parsing procedure is invoked to parse the remaining path elements of the specified object pathname.

5 Claims, 5 Drawing Sheets

OBJECT ORIENTED COMPUTER ARCHITECTURE USING DIRECTORY OBJECTS

This is a continuation of application Ser. No. 08/084,292 filed Jun. 28, 1993, now U.S. Pat. No. 5,463,774.

The present invention relates to digital computer systems utilizing object oriented operating systems, and more particularly relates to a system and method for locating a specified object in the computer's memory.

BACKGROUND OF THE INVENTION

The present invention represents an improvement on the object oriented operating system represented by U.S. Pat. No. 5,129,083, issued Jul. 7, 1992, "Conditional Object Creation System and Method In An Object Based Computer Operating System"; U.S. Pat. No. 5,136,712, issued Aug. 4, 1992, "Temporary Object Handling System and Method In An Object Based Computer Operating System"; and particularly U.S. Pat. No. 5,129,084, issued Jul. 7, 1992, "Object Container Transfer System and Method In An Object Based Computer System". Those patents are hereby incorporated by reference as background information.

In Unix, Microsoft's DOS for personal computer, and many other operating systems, files are located using a hierarchy or tree structure of file directories. In such operating systems there is a single defined syntax for defining the pathname of each file. In DOS, the definition of a file's pathname is Diskname:\[Directory\]*filename where "[Directory\]*" means that a pathname will contain zero or more pathname elements that comprise a Directory name followed by a backslash ("\"). Furthermore, in Microsoft DOS there is a single definition of the syntax for disknames and another single definition for all directory names and filenames. In other words, in Microsoft DOS one cannot have a directory which uses a completely different pathname syntax than other directories. The file pathname rules for Unix are different from those of Microsoft DOS, but the limitations are similar: there is a single pathname syntax used for locating all files in a computer system.

Furthermore, both Unix and Microsoft DOS use a hierarchical tree of directories for defining each file's position. In other words, only one pathname is defined for each file.

The present invention is concerned with providing "object directory" data structures for quickly and efficiently locating objects stored in a computer system, while providing almost complete flexibility in terms of the object naming and path naming conventions used to indicate an object's storage location. In the context of the present invention, objects include a wide variety of ephemeral or temporary objects which exist only for the duration of a particular computation, as well as permanent objects such as files, file systems, and operating system objects that are the foundation of the computer system's operating system. In an object oriented operating system, there are typically several dozen types of objects in addition to disk files.

In U.S. Pat. No. 5,136,712, all objects must be located through the use of "object containers", all of which have a predefined data structure. Furthermore, the routines used for locating objects through use of the object containers were entirely predefined by the operating system.

It is a premise of the present invention that while it is useful for a computer operating system to have a default pathname convention and default object locating procedure for locating objects, it would also be useful and efficient to allow a computer system to allow the use of a variety of pathname conventions and object location procedures that differ from the default convention and procedure. For instance, process objects and thread objects are extremely ephemeral, and thus the data structures and procedures for locating such objects might be best implemented differently than the data structures and procedures used to locate other types of objects. Similarly, different filing subsystems might profitably use different data structures and procedures for locating file objects.

SUMMARY OF THE INVENTION

In summary, the present invention is a computer system having a memory for storing objects, which include a variety of different data structures. The objects stored in memory include a directed graph of directory objects for locating and accessing the stored objects. Each directory object stores object names and object pointers for locating and accessing other objects. A root directory object, which is the starting point for locating any specified object, stores object names and object pointers to a set of first level directory objects.

Each object is identified by an associated pathname that defines a path through the directed graph of directory objects for accessing that object. More particularly, each pathname is a succession of path elements, proceeding from a first path element to a last path element.

At least two of the directory objects include a distinct pathname parsing procedure (also called a parse method) for locating objects whose pathname includes a path element that identifies that directory object as part of the path's pathname. When parsing a specified object pathname, the path elements are successively parsed, one at a time by accessing the corresponding directory object, and then using the information in that directory object to access the directory object associated with a next path element. When a directory object is accessed that has its own pathname parsing procedure, that directory object's pathname parsing procedure is invoked to parse the remaining path elements of the specified object pathname.

In a preferred embodiment, a default pathname parsing procedure is used for parsing any specified pathname, staring with said first path element, until the default pathname parsing procedure accesses a directory object having a distinct pathname parsing procedure.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
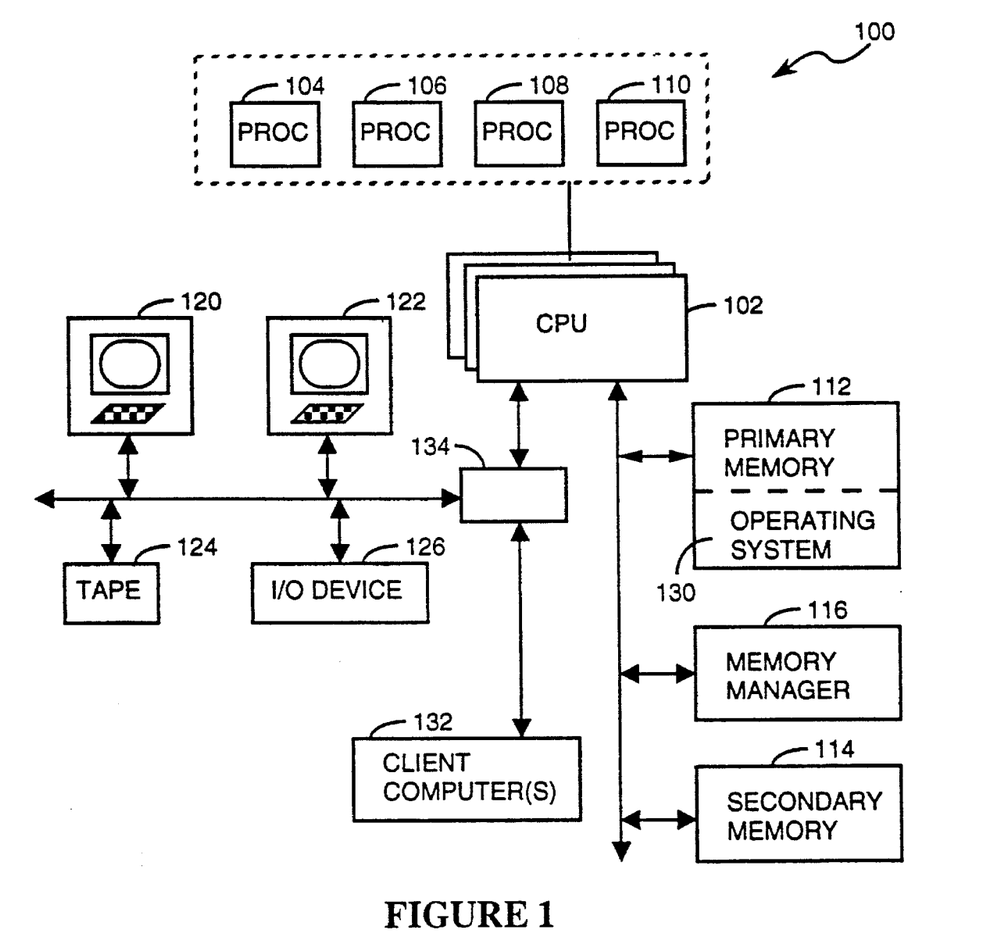
FIG. 1 is a block diagram of a computer system having an object oriented operating system.

Referring to FIG. 1, a computer system 100 in accordance with the present invention includes a high speed central processing unit (CPU) 102 (such as Digital Equipment Corporation's Alpha processor) which concurrently runs several processes 104–110. The CPU 102 may be either a single powerful processor or may contain multiple processors. As is standard in multitasking computer systems, each process has its own virtual memory space which is mapped partially into high speed primary memory 112 and partially into lower speed secondary memory 114 by a virtual memory manager 116. More generally, each process 104–110 is allocated a certain portion of computer's resources, including selected peripheral devices such as terminals 120–122 and other input/output devices 124 and 126. Other types of resources which are allocated to selected ones of the processes include specified sets of data and data structures in the system's memory 112–114.

The set of software which controls the computer's operation and the allocation of resources to the processes 104–110 running the computer is called the operating system 130. For the purposes of the present discussion it can be assumed that the operating system 130 is resident in primary memory 112, although certain infrequently used portions of the operating system may be swapped out to secondary memory by the memory manager 116. The computer system 100 can serve as a "computer server" to one or more client computers 132. Client computers 132, coupled to the CPU 102 by a bus interface 134, can send tasks to the computer system 100 for execution.

The object architecture of the present invention is a set of data structures and procedures which controls the use of user definable objects.

GLOSSARY

To clarify the following discussion, the following definitions are provided.

"Objects" are data structures used to hold information that is used by the operating system and which must be protected from unauthorized access by users of the system. While users cannot themselves "define" objects, they can ask the operating system to create specified objects on their behalf. The resultant objects are system data structures that are accessible by the user through system routines which protect the integrity of those objects. For instance, a "process object" is a type of object used in the present invention to store the information needed by the operating system to keep track of the status of a particular user process. "User accessible objects" are objects used by user processes, and will be referred to herein simply as "objects."

"Kernel objects" are a distinct set of data abstractions used by the system's kernel and are called kernel objects in order to distinguish them from the regular objects which are part of the object architecture of the present invention. An example of a kernel object is a primitive waitable object, such as a timer, event or semaphore object used for synchronizing the operation of two or more threads.

A "user" is herein defined to mean a person or other entity recognized by the computer system as being authorized to create processes and to use resources in the computer system.

A "process" is the entity to which a virtual memory address space is assigned, and is the entity to which process-level objects are assigned.

A "thread", also called an "execution thread" or a "thread of execution", is the entity which actually executes programs and thus provides a stream of execution (sometimes called a context state). It is the schedulable entity which executes program steps and consumes resources. More technically, a thread is a system defined object that executes a program that is resident in a process's address space. A thread contains a machine state that consists of the computer's register contents, a program counter, and other privileged information needed to cause the thread to execute a program. Each process many create a number of execution threads which run "simultaneously" and which can share resources and communicate with one another. Multiple threads can run simultaneously when multiple CPUs are available. On a single CPU system the operating system makes the threads appear to run simultaneously. All resource limitation data structures for a thread belong to the thread's process.

A "directory object", sometimes herein called an "object directory", is a data structure that stores object names and pointers to objects. Directory objects can use either a table data structure or a linked list data structure to store information for identifying and locating a set of objects.

A "parse method", also called a "parsing procedure" or a "parse method procedure", is a software procedure for analyzing a specified pathname so as to locate in memory the object corresponding to the specified pathname.

OBJECT HIERARCHY

Figure 2:
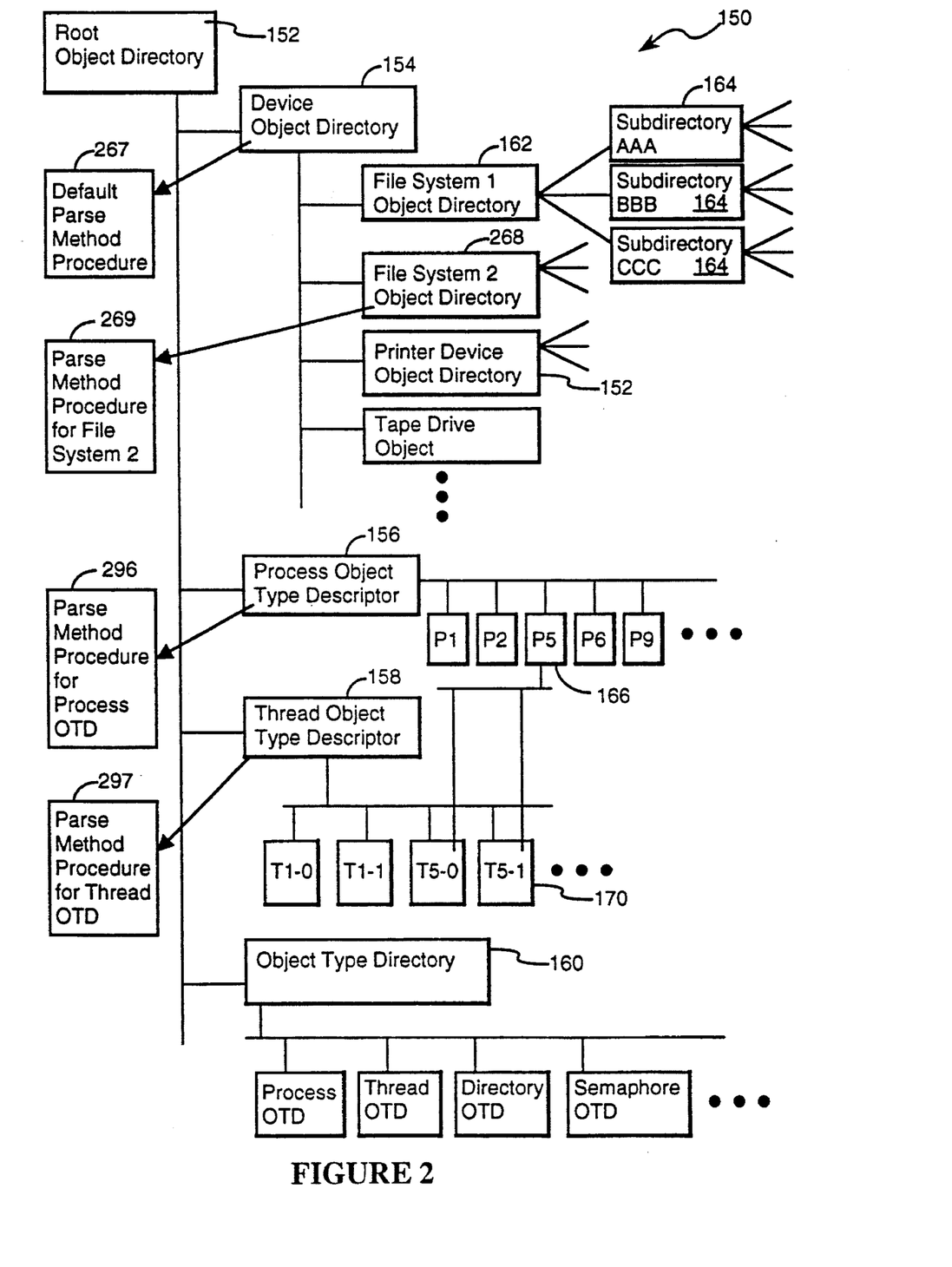
FIG. 2 is a block diagram of a directed graph of directory objects in accordance with the present invention.

Referring to FIG. 2, stored in the computer system's memory 112–114 are a set of object directories that are used for locating all objects stored in the computer system's memory. The set of object directories are typically called an "object directory hierarchy" or "object hierarchy" because one can start with a root directory and then trace an object's pathname though various directory levels until the object is located. However, in the preferred embodiment of the present invention there can be more than one path through the object directories to a particular object, and thus the set of object directories is technically not a tree structure, but rather is a "directed graph" 150.

The top level object in the directed graph 150 is a "root object directory" 152, which contains names and address pointers for a set of first level object directories 154, 156, 158, 160. Those object directories in turn contain names and pointers to objects at the next level lower in the object hierarchy, and so on.

In the example shown in FIG. 2, the first level of object directories below the root directory object 152 are a "device directory object" 154 (which is used for locating files, device drivers, physical devices, and so on), an object type directory 160 used for locating the "object type descriptors" (also known as "type objects") utilized by the operating system's kernel, as well as a process object type descriptor 156 and a thread object type descriptor 158.

For the purposes of the preferred embodiment, there are three types of object directories: (1) directory objects, (2) object type descriptors, and (3) process objects. Alternately, one could say that there are three types of "directory objects": standard directory objects which reference objects in the object hierarchy by way of object name tables, and "object type descriptors" and "process objects" that reference objects by way of a linked list. These three types of objects directories will described in more detail below with reference to FIGS. 4 and 5.

The objects referenced in a directory object can include both directory objects and non-directory objects. For instance, the device object directory 154 references an object called "File System 1 Object Directory" 162, which is a directory object, and that directory object in turn references a number of subdirectory objects 164.

The location of each object in the computer's memory 112–114 is specified by an object pathname. The definition of a pathname in the preferred embodiment is /[Directory/]*objectname where "[Directory/]*" means that a pathname will contain zero or more pathname elements that comprise a Directory name followed by a delimiter symbol (such as the Unix forward slash delimiter "/"), followed by a final path element herein called the objectname. In other implementations a different delimiter, such as the "DOS style" backslash ("\") or a period could be used to separate pathname elements. The "objectname" is also called the final pathname element.

An aspect of the preferred embodiment is that, in some circumstances, an object may have more than one valid pathname. For instance, a thread object 170 shown in FIG. 2 can have two pathnames:/Process/P5/T1 and /Thread/T1. In the pathname "/Process/P5/T1" the "Process" element of the pathname identifies Process object type descriptor 156, the "P5" element of the pathname identifies process object 166, and the "T1" element identifies thread object 170.

Another aspect of the present invention is that it is sometimes useful to be able to use distinct naming conventions for different portions of the object hierarchy, such as for object stored on different computer systems that together operate as one computer system. Another example is the ability to use two or more distinct file systems in a single computer system, as shown in FIG. 2.

OBJECT DATA STRUCTURE

Figure 3:
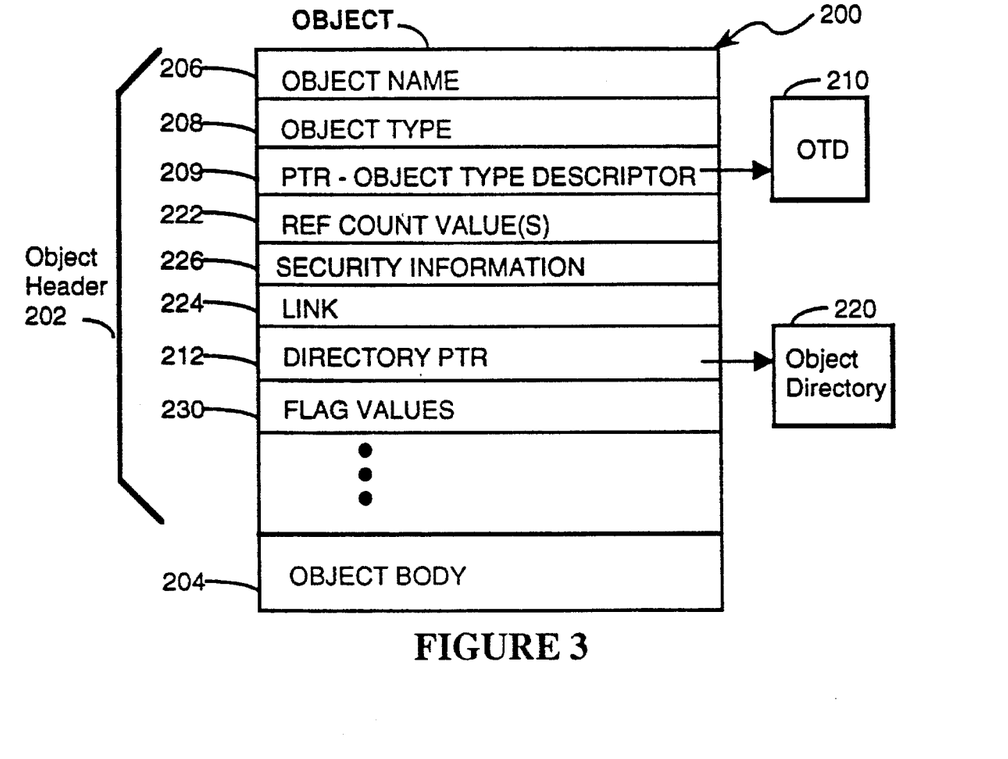
FIG. 3 is a block diagram of an object data structure.

Referring to FIG. 3, when an object 200 is created, a data structure having an object header 202 and an object body 204 is created. The format of the object header is essentially the same for all objects, regardless of the object type, and is used by the operating system's kernel to determine essential characteristics of the object and also to limit access to the object in accordance with specified security information. Only the operating system's kernel mode routines can access and change an object's header 202. The format of the object body 204 varies from object type to object type, and each object type has a set of object type specific service routines for performing standard tasks such as allocating and deallocating space in memory for an object instance.

The object header 202 of each object is a data structure that has a number of fields, a few of which will be discussed next. Each object has an associated object name 206 field that contains either the text of that name, or a pointer to a name string stored elsewhere in memory.

The object type 208 identifies the type of the object. The PTR-Object Type Descriptor field 209 contains a pointer to an object type descriptor (OTD) 210 for this particular object type. OTDs will be discussed below with reference to FIG. 5.

The Directory PTR 212 is a pointer to the object directory 220 to which the object 200 is assigned and is said to reside. This field, also called the object's back pointer, is dynamic in that the object may be transferred to a different object directory. In some cases the object directory object for an object will be a directory object, and in other cases it may be the OTD for all objects of that type.

The object Ref Count Values 222 represent the number of object IDs or handles that have been created for the object. The object Ref Count Values 222 signify the number of reasons that the storage for an object should not be deallocated. The ID count 222, like the other fields of the object header, is manipulated solely by the operating system kernel. If the object ID count 222 is zero, then no process has a pointer to that object.

The link field 224 contains a forward pointer to the next object header of this type, as well as a backward link to the previous object header of this type. Thus all objects of each type are linked into a doubly linked list. The list head resides in the OTD for the object type, as will be shown in FIG. 5.

The object's Security Information 226 is a set of several data fields used to restrict access to the object. The use of Access Control Lists and the like are well known. It should be noted, however, that directory objects are objects, and thus have security information stored in their object headers that can be used to restrict access to all objects below those directory objects in the object directory hierarchy.

Several binary flags 230 govern use of the object. For instance, a "temporary flag" is set when the object is a temporary object. Another example is an access mode flag that denotes the owner mode (kernel or user) of the object. Kernel-mode objects may not be created in user owned containers.

DIRECTORY OBJECT DATA STRUCTURE

Figure 4:
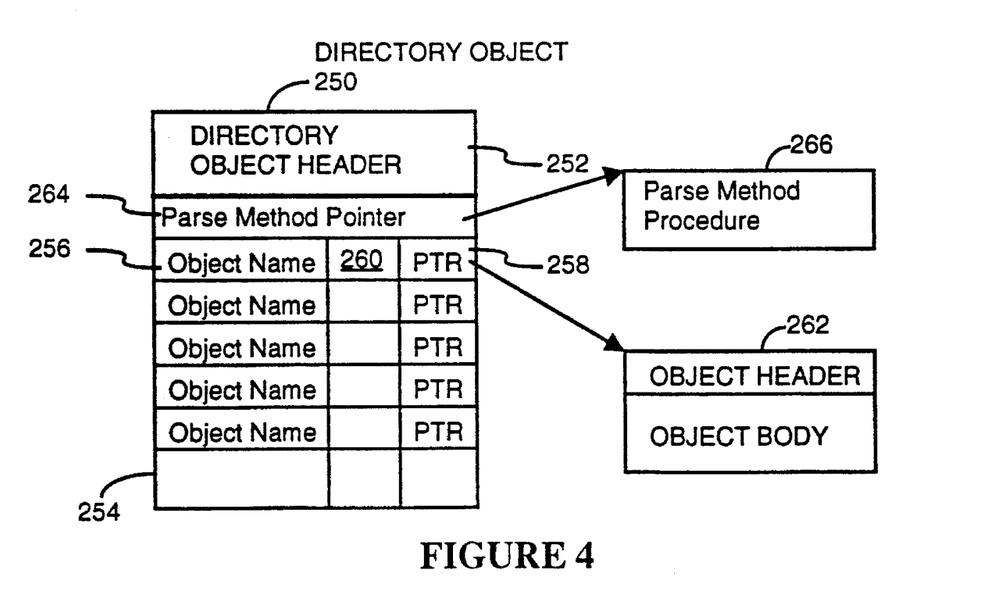
FIG. 4 is a block diagram of a first directory object data structure.

Referring to FIG. 4, each directory object 250 has a standard object header 252 and an object body 254 that contains a table of object names 256 and corresponding pointers 258 for accessing the objects listed in that directory object. Pointers will typically be either virtual memory addresses or disk location addresses. Other parameters 260 may be stored for each object 262 referenced by the directory object, to facilitate object management functions by the operating system. The body of each directory object also contains a field 264 for storing an optional pointer to a parse method procedure 266. This pointer 264 is given a non-zero value only for directory objects that have an associated pathname parse procedure for locating objects below that directory object in the object hierarchy.

In the preferred embodiment, the root directory object 152 contains a pointer to the default pathname parse procedure 267 (see FIG. 2) used for parsing all object pathnames. Alternately, the default pathname parse method procedure 267 may be incorporated into the operating system 130. Other directory objects contain a pointer to a parse method procedure only if the method of parsing pathnames for objects below that directory object in the object hierarchy differs from the default parse method. For instance, in FIG. 3 the File System 2 Directory Object 268 has a pointer to its own parse method procedure 269, while the File System 1 Directory Object does not. Thus File System 1 uses the default pathname parsing method for locating files stored in that file system, while File System 2 uses a distinct parse method procedure. For example, File System 2 might require period delimiters between pathname elements and might have different rules than the default parse method procedure as to what constitutes a legal object (i.e., file) name.

OBJECT TYPE DESCRIPTOR (OTD) DATA STRUCTURE

Figure 5:
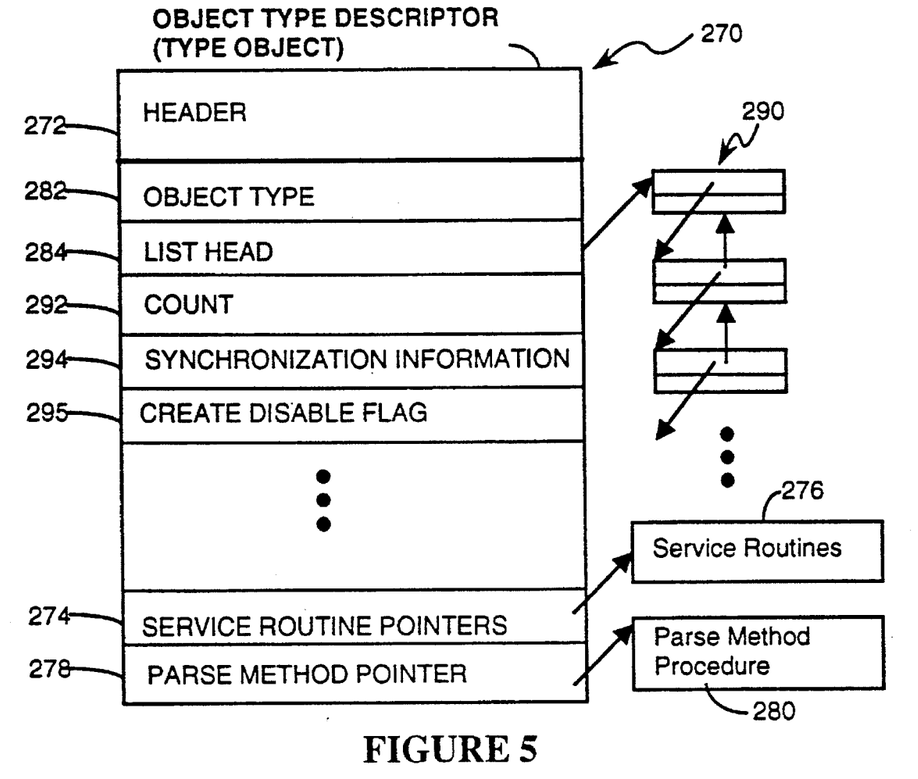
FIG. 5 is a block diagram of a second directory object data structure.

Referring to FIG. 5, there is a single object type descriptor (OTD) 270 for each object type defined by the system.

OTDs, also sometimes called "type objects" are objects, and thus the OTD has a standard object header 272.

OTD objects each have an object body which contains general information about an object type, not a particular instance of an object. For example, an OTD indicates whether an object type supports synchronization or wait operations. Anything an OTD specifies about an object type applies to all instances of that object type.

All the fields of the OTD's body have a standardized definition. This allows operating system executive to use the information in an OTD without having any detailed knowledge of the corresponding object type.

Part of the information in each OTD 270 is a set of service routine pointers 274 to a number of service routines 276 that may be called by the operating system. These service routines have standard definitions across all object types, but require object type-specific processing. The routines are located by the operating system's executive via standard offsets into the OTD, at which are located the pointers 274 to these routines.

An optional service routine pointer added to the OTD data structure by the present invention is a pointer 278 to a parse method procedure 280. This pointer is given a non-zero value only for OTD that are used as an object directory in the object hierarchy. Other OTDs may or may not contain a pointer to a parse method procedure, depending on how the object hierarchy is to be used in any particular implementation of the present invention.

The Object Type field 282 contains a value indicating the type of object the OTD represents.

The List Head field 284 is a list head for a linked list 290 of all the object instances of this type. In a preferred embodiment, the linked list is a doubly linked list. The List Head field 284 contains a forward link to the first object header of this type, and a backward link to the last object header of this type. These links are used for consistency checking within the object architecture, and are also used for locating objects such as process objects and thread objects whose "object directory" in the object directory hierarchy is actually the Type Object 270 for those objects.

The Count field 292 contains a count of the number of objects of the corresponding type that currently exist in the system.

The Synchronization Information field 294 is used only for object types which support wait operations. When non-negative, this field indicates the location of a "kernel synchronization primitive" which is located inside the object body for object instances of this type. The Synchronization information 294 is used to compute a pointer to the kernel synchronization primitive that is stored in each object's header.

The Create Disable Flag 295, when set, prevents additional objects of this type from being created. It is used as part of process of shutting the system down in an orderly fashion.

The OTD object body typically will contain other parameters needed for management of objects of the type defined by the OTD, but which are not directly related to the present invention.

In the preferred embodiment, some of the OTDs or type objects are used as object directories for extremely ephemeral types of objects such as thread objects, process objects and the like. In particular, the object directory for process objects is the Process OTD 156 and the object directory for thread objects is the Thread OTD 158 (see FIG. 2). Since the procedure for finding a specified object in a linked list 290 (see FIG. 5) of objects is different from finding a specified object in an object directory table, the OTDs that are used as object directories will each have a pointer to a parse method procedure. In particular, the search procedure for finding an item in a linked list requires a sequential search through the list and following links from item to item in the linked list, while finding an item in a table is much simpler and faster.

As shown in FIG. 2, the Process OTD 156 has a pointer to a parse method procedure 296 and the Thread OTD 158 has a pointer to a different parse method procedure 297. The parse method procedure for the process OTD is different from the parse method that would be used for most other OTDs because it is possible to reference thread objects indirectly through the Process OTD. In other words, a legal pathname that includes the Process OTD in the directory path to an object can also include a reference to a process object followed by a reference to a thread object.

Figure 6:
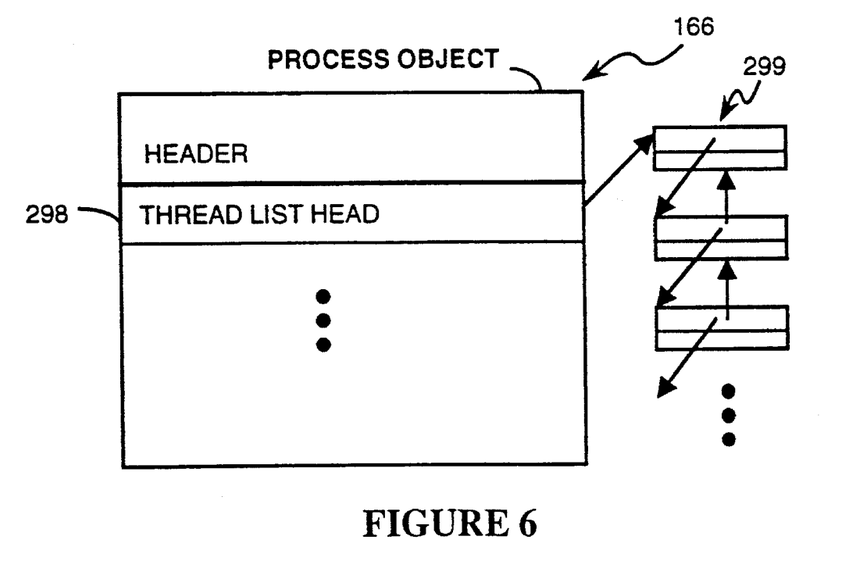
FIG. 6 is a block diagram of a process object data structure.

As shown in FIG. 6, each process object 166 includes a thread list head 298 that points to a linked list of thread objects 299 that represent the set of threads running in the address space of that process. In the preferred embodiment, a process object is used as an object directory for locating the thread objects representing the threads running in a process, although thread objects can also be more directly accessed via the thread OTD 158.

OBJECT PATHNAME PARSING METHODOLOGY

Figure 7:
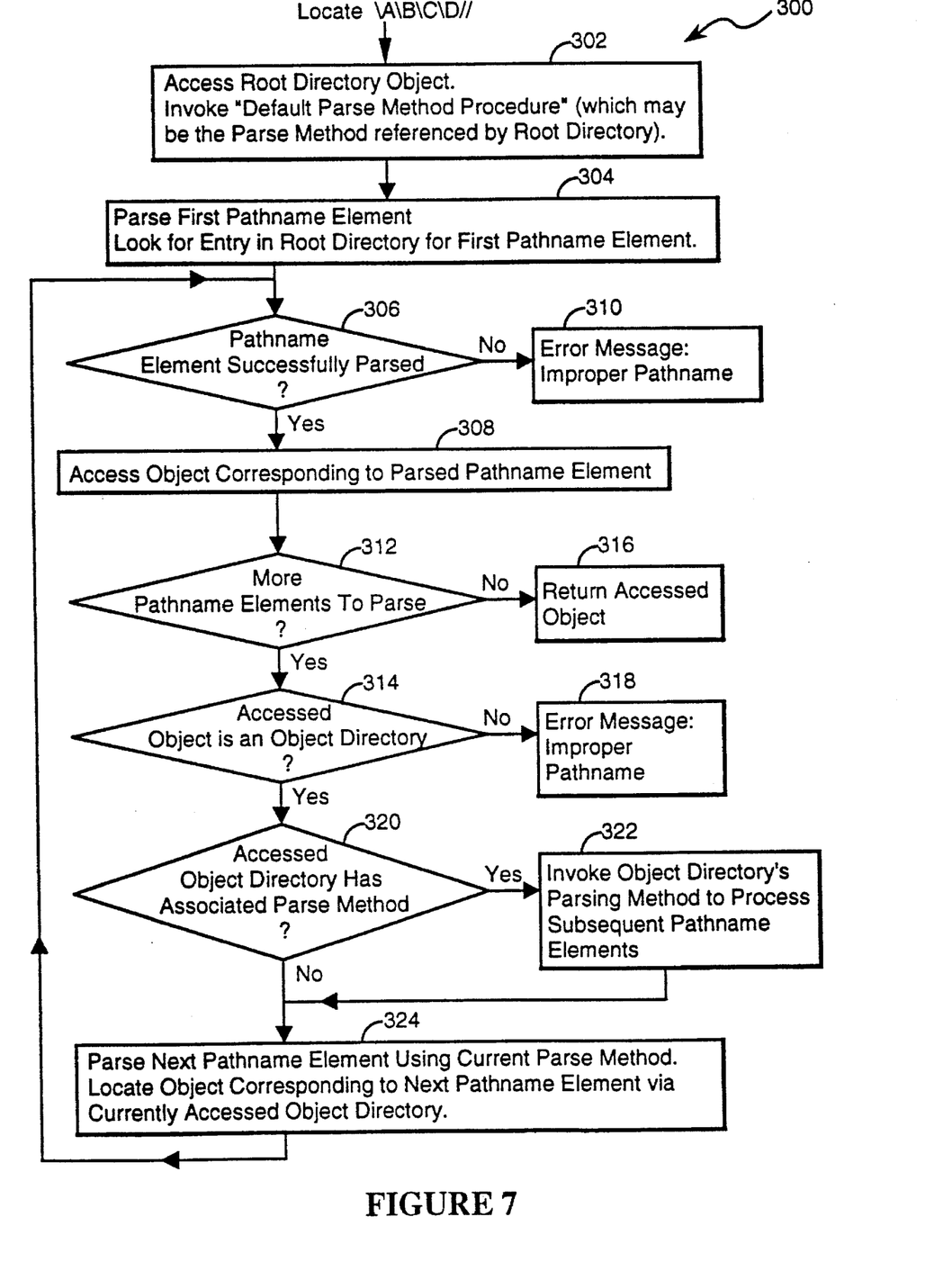
FIG. 7 is a flow char of the pathname parsing method of the present invention.

Referring to FIG. 7, the operating system's procedure 300 for parsing pathnames so as to locate a specified object is as follows. Upon receiving a request to locate or access an object having a specified pathname, the root directory object is accessed, and the default parse method procedure is invoked (step 302). As mentioned above, the default parse method procedure is pointed to by the root directory object in the preferred embodiment, but may also be defined as part of the object management routines in the operating system 130.

Using the default parse method, the first pathname element of the specified object pathname is parsed and a search is made for an entry in the root directory object corresponding to that first pathname element (step 304). If an entry corresponding to the parsed pathname element is located, indicating that the pathname element was successfully parsed (step 306), that directory entry is used to access the object corresponding to the parsed pathname element (step 308). If no such entry is found in the root directory object (step 306) an error message is generated indicating that the specified pathname was improper or that the specified object could not be found (step 310).

If the specified pathname contains more pathname elements to be parsed (step 312), the accessed object is checked in step 314 to determine that it is an object directory (i.e., that is a directory object, OTD, or process object). If the specified pathname does not contain any more pathname elements to be parsed, the procedure simply returns the last accessed object (step 316), which may be a directory object or other type of object. On the other hand, if the last accessed object is not an object directory (314), but there are more pathname parameters still to be parsed (step 312), an appropriate error message is generated (step 318).

Assuming that there are more elements to parse and that the last accessed object is an object directory, the next step is to determine whether the accessed object directory has an associated parse method (step 320). If so, then that parse method is accessed and invoked (step 322) so that all remaining unparsed elements of the specified pathname will be parsed using that parse method. Thus, the invoked parse method becomes the "current parse method" used for parsing all pathname elements after the pathname element that was last parsed.

Next, at step 324, the next pathname element is parsed using the current parse method, and a search is made to locate the object corresponding to the parsed pathname element using the currently accessed object directory. Then the procedure loops back to step 306 to continue processing of the specified pathname. Procedure 300 continues until either an error is encountered or an object is accessed and returned to the entity that called the procedure.

It should be noted that the operating system's security procedures for limiting user access to objects through the use of object access control lists and the like are fully active throughout the object pathname parsing procedure 300. Thus, if a user attempts to access a part of the object hierarchy that the user is not entitled to access, access to the object will be blocked because access will be denied to one or more the object directories needed to access that object.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A memory for storing data for access by programs being executed on a data processing system, comprising:

a multiplicity of objects comprising data structures stored in said memory;

said multiplicity of objects including a directed graph of directory objects for locating and accessing said multiplicity of objects, each directory object storing object names and object pointers for locating and accessing other objects stored in said memory; said directory objects including a root directory object which includes object names and object pointers to a set of first level directory objects;

each said object being identified by an associated pathname that defines a path through said directed graph of directory objects for accessing said each object; each pathname comprising a succession of path elements that includes first and last path elements;

said root directory object and a plurality of other ones of said directory objects each including a distinct pathname parsing procedure for locating those of said multiplicity of objects whose pathname includes (A) a path element, other than said last path element, identifying said each directory object;

each parsing procedure including commuter executable instructions for receiving a specified object pathname and for successive parsing said path elements in said specified object pathname by (A) accessing successive directory objects identified by said successively parsed path elements, and (B) accessing the object identified by said specified object pathname when said last path element is parsed; at least a plurality of said parsing procedures further including instructions for determining when any of said accessed directory objects includes a distinct pathname parsing procedure and for invoking said distinct pathname parsing procedure of said accessed directory object to parse the path elements of said specified object pathname not yet parsed.

2. A memory for storing data for access by programs being executed on a data processing system, comprising:

a multiplicity of objects comprising data structures stored in said memory;

said multiplicity of objects including a directed graph of directory objects for locating and accessing said multiplicity of objects, each directory object storing object names and object pointers for locating and accessing other objects stored in said memory; said directory objects including a root directory object which includes object names and object pointers to a set of first level directory objects;

each said object being identified by an associated pathname that defines a path through said directed graph of directory objects for accessing said each object; each pathname comprising a succession of path elements that includes first and last path elements;

a plurality of said directory objects each including a distinct pathname parsing procedure for locating those of said multiplicity of objects whose pathname includes a path element, other than said last path element, identifying said each directory object;

each parsing procedure including commuter executable instructions for receiving a specified object pathname and for successive parsing said path elements in said specified object pathname by (A) accessing successive directory objects identified by said successively parsed path elements, and (B) accessing the object identified by said specified object pathname when said last path element is parsed; at least a plurality of said parsing procedures further including instructions for determining when any of said accessed directory object includes a distinct pathname parsing procedure and for invoking said distinct pathname parsing procedure of said accessed directory object to parse the path elements of said specified object pathname not yet parsed.

3. The memory of claim 2, further including a default pathname parsing procedure for parsing any specified pathname, starting with said first path element, until said default pathname parsing procedure accesses one of said directory objects having a distinct pathname parsing procedure.

4. The memory of claim 2, wherein said multiplicity of objects includes process objects, each process object corresponding to a process running on said computer system, thread objects, each thread object corresponding to a thread of execution running on said computer system, at least one file system object comprising an object for accessing at least one file system on said computer system;

said directory objects include a process directory object for locating and accessing said process objects, a thread directory object for locating and accessing said thread objects, and said file system objects;

said process and thread directory objects each having a distinct pathname parsing procedure.

5. The memory of claim 4, at least one of said file system objects having a distinct pathname parsing procedure.

* * * * *

UNITED STATES PATENT AND TRADEMARK OFFICE
CERTIFICATE OF CORRECTION

PATENT NO. : 5,615,363
DATED : March 25, 1997
INVENTOR(S) : Steven M. Jenness

It is certified that error appears in the above-identified patent and that said Letters Patent is hereby corrected as shown below:

Column 9,
Line 56, delete "commuter" and insert therefor -- computer --

Column 10,
Line 29, delete "commuter" and insert therefor -- computer --

Signed and Sealed this

Twenty-first Day of June, 2005

JON W. DUDAS
*Director of the United States Patent and Trademark Office*